(12) United States Patent
Wang et al.

(10) Patent No.: US 11,151,182 B2
(45) Date of Patent: Oct. 19, 2021

(54) CLASSIFICATION MODEL TRAINING METHOD AND APPARATUS

(71) Applicant: Huawei Technologies Co., Ltd., Shenzhen (CN)

(72) Inventors: Yasheng Wang, Shenzhen (CN); Yang Zhang, Shenzhen (CN); Shuzhan Bi, Shenzhen (CN); Youliang Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 182 days.

(21) Appl. No.: 16/596,938

(22) Filed: Oct. 9, 2019

(65) Prior Publication Data

US 2020/0042829 A1 Feb. 6, 2020

Related U.S. Application Data (63) Continuation of application No. PCT/CN2018/093716, filed on Jun. 29, 2018.

(30) Foreign Application Priority Data

Jul. 24, 2017 (CN) .......................... 201710608188.1

(51) Int. Cl.
*G06F 16/36* (2019.01)
*G06F 40/237* (2020.01)
(Continued)

(52) U.S. Cl.
CPC ............ *G06F 16/36* (2019.01); *G06F 40/237* (2020.01); *G06K 9/6255* (2013.01);
(Continued)

(58) Field of Classification Search
None
See application file for complete search history.

(56) References Cited

U.S. PATENT DOCUMENTS 10,127,214 B2 * 11/2018 Munro .................. G06F 16/367
10,354,170 B2 * 7/2019 Fu ........................ G06K 9/6257
(Continued)

FOREIGN PATENT DOCUMENTS

CN 101344922 A 1/2009
CN 103902968 B 3/2015
(Continued)

OTHER PUBLICATIONS

Liu, B., "Building Text Classifiers Using Positive and Unlabeled Examples," Proceedings of the Third IEEE International Conference on Data Mining (ICDM 03), 2003, 8 pages.
(Continued)

*Primary Examiner* — Mohammed Rachedine
(74) *Attorney, Agent, or Firm* — Conley Rose, P.C.

(57) ABSTRACT

A classification model training method includes obtaining a positive training set and a first negative training set, where the positive training set includes samples of a positive sample set in a corpus, where the first negative training set includes samples of an unlabeled sample set in the corpus, training, using the positive training set and the first negative training set, to obtain a first classification model, determining, using the first classification model, a pseudo negative sample in the first negative training set, removing the pseudo negative sample from the first negative training set, updating the first negative training set to a second negative training set, and training, using the positive training set and the second negative training set, to obtain a target classification model.

20 Claims, 3 Drawing Sheets

(51) Int. Cl.
*G06K 9/62* (2006.01)
*G06N 20/00* (2019.01)
*G06N 3/04* (2006.01)
*G06N 20/10* (2019.01)
*G06F 40/00* (2020.01)

(52) U.S. Cl.
CPC ......... *G06K 9/6257* (2013.01); *G06K 9/6259* (2013.01); *G06K 9/6262* (2013.01); *G06N 20/00* (2019.01)

(56) References Cited

U.S. PATENT DOCUMENTS

| | | | | |
|---|---|---|---|---|
| 10,997,134 | B2* | 5/2021 | Osesina | G06N 5/048 |
| 11,023,677 | B2* | 6/2021 | Simard | G06F 3/0482 |
| 2009/0030862 | A1* | 1/2009 | King | G06K 9/6277 706/45 |
| 2010/0306144 | A1* | 12/2010 | Scholz | G06F 16/353 706/20 |
| 2013/0103623 | A1* | 4/2013 | Burstein | G06F 40/237 706/12 |
| 2014/0172754 | A1 | 6/2014 | He et al. | |

FOREIGN PATENT DOCUMENTS

| | | | | |
|---|---|---|---|---|
| CN | 104462409 | A | * | 3/2015 |
| CN | 104850832 | A | | 8/2015 |
| CN | 104992184 | A | | 10/2015 |
| CN | 102385704 | B | | 11/2015 |
| CN | 105069470 | A | | 11/2015 |
| CN | 105930411 | A | | 9/2016 |
| CN | 106570164 | A | | 4/2017 |
| CN | 106778796 | A | | 5/2017 |
| CN | 107122351 | A | * | 9/2017 |
| CN | 109074420 | A | * | 12/2018 | ............ G06N 20/00 |
| WO | WO-2016054301 | A1 | * | 4/2016 | ............ G06F 16/36 |
| WO | WO-2016134183 | A1 | * | 8/2016 | ............ G06N 3/04 |

OTHER PUBLICATIONS

Machine Translation and Abstract of Chinese Publication No. CN102385704, Nov. 25, 2015, 16 pages.
Machine Translation and Abstract of Chinese Publication No. CN103902968, Mar. 25, 2015, 19 pages.
Machine Translation and Abstract of Chinese Publication No. CN104850832, Aug. 19, 2015, 12 pages.
Machine Translation and Abstract of Chinese Publication No. CN104992184, Oct. 21, 2015, 16 pages.
Machine Translation and Abstract of Chinese Publication No. CN105069470, Nov. 18, 2015, 24 pages.
Machine Translation and Abstract of Chinese Publication No. CN105930411, Sep. 7, 2016, 14 pages.
Machine Translation and Abstract of Chinese Publication No. CN106570164, Apr. 19, 2017, 10 pages.
Machine Translation and Abstract of Chinese Publication No. CN106778796, May 31, 2017, 15 pages.
Xingming, "Classification method based on PU-Learning," Sep. 20, 2015.Retrieved from the internet: http://blog_xiaoduoai.com/?p=344, 10 pages.
CSDN Blog., "Summarize sample screening and feature processing in data mining prediction classification," Retrieved from the internet: https://read01.com/QNNBnJ.html, Jan. 1, 2015, 5 pages.
Wang, X., et al. Undecimated Wavelet Bayesian Image Denoising Method with Its Threshold Determined by Curve Fitting, PRandAI, vol. 29 No. 4, Apr. 2016, 10 pages. With English abstract.
Foreign Communication From a Counterpart Application, PCT Application No. PCT/CN2018/093716, English Translation of International Search Report dated Sep. 29, 2018, 2 pages.

* cited by examiner

S210. Obtain a positive training set and a first negative training set

S220. Perform training, using the positive training set and the first negative training set, to obtain a first classification model S230. Determine, using the first classification model, a pseudo negative sample in the first negative training set S240. Remove the pseudo negative sample from the first negative training set, and update the first negative training set to a second negative training set S250. Perform training, using the positive training set and the second negative training set, to obtain a second classification model, where the second classification model is a target classification model

CLASSIFICATION MODEL TRAINING METHOD AND APPARATUS

CROSS-REFERENCE TO RELATED APPLICATIONS

This application is a continuation application of International Patent Application No. PCT/CN2018/093716 filed on Jun. 29, 2018, which claims priority to Chinese Patent Application No. 201710608188.1 filed on Jul. 24, 2017. The disclosures of the aforementioned applications are hereby incorporated by reference in their entireties.

TECHNICAL FIELD

This application relates to the information processing field, and in particular, to a classification model training method and apparatus.

BACKGROUND

A natural language processing (NLP) technology is one of core technologies for implementing artificial intelligence. Using the NLP technology, a computer can understand and process a natural language, to implement smooth human-computer interaction. Research on the NLP technology covers machine learning, semiotics, linguistics, and the like.

The research on the NLP technology includes many tasks that require a dedicated dictionary as an auxiliary resource. A dictionary may be a set of words with a common attribute, for example, a set of words with a place attribute, an emotion attribute, or a dirty language attribute, or may be a set of words in a specific field, for example, a set of words that are in the religious field or in the medical field. Use of the dictionary may assist the computer in understanding the natural language in various manners. For example, a text emotion analysis task in the NLP technology obtains, by processing and analyzing content of a text, an emotional state expressed by the text. In the text emotion analysis task, usually, a word with an emotional inclination in a sentence needs to be identified. Then, an emotional state of a phrase, an emotional state of a sentence, or an emotional state of a chapter is determined using a method such as syntax rule analysis and machine learning classification. The word with an emotional inclination in the sentence needs to be identified using an emotion dictionary. For another example, in the human-computer interaction, a dirty language or a sensitive word usually needs to be filtered out. This process needs to be implemented using a dirty language dictionary or a sensitive word dictionary. With development of artificial intelligence, more applications and fields need to be supported by the NLP technology, and therefore a large quantity of dictionaries used for a computer need to be sorted.

In the other approaches, constructing or extending a dictionary is mainly implemented in a manual manner, for example, identification and sorting of words are manually performed from a large quantity of related corpuses, to construct or extend a related dictionary. However, the manual manner requires an expert in a related field to spend a lot of time and material resources. Therefore, costs are very high, and there is a possibility of incompleteness. An emotion dictionary is used as an example. A current emotion dictionary is manually summarized from corpuses such as news and a literary works. On one hand, workload of a person is heavy. On the other hand, with development of a network, a large quantity of new words emerges, and consequently an original emotion dictionary becomes incomplete and cannot meet an existing application. In addition, the manual manner may vary from person to person, probably making the dictionary not highly reliable.

To resolve the foregoing technical problems, a method for constructing or extending a dictionary based on machine learning is provided in the other approaches. The method mainly includes extracting a corresponding feature from a large-scale corpus to construct a classifier, and then determining, using the classifier, whether a word in the corpus is in a dictionary, thereby implementing construction or extension of the dictionary. However, a disadvantage of the method is that a large quantity of positive samples and negative samples need to be manually labeled in advance to train the classifier. To be specific, the method also requires an expert in a related field to spend a lot of labor and material resources to resolve the technical problems, and accuracy of the classifier depends on accuracy of manual labeling.

SUMMARY

This application provides a classification model training method and apparatus. Accuracy of the classification model may be improved by optimizing a training set and without requiring manual labeling, thereby improving accuracy of a dictionary.

According to a first aspect, a classification model training method is provided. The method includes obtaining a positive training set and a first negative training set, where the positive training set includes samples of a positive sample set in a corpus, the first negative training set includes samples of an unlabeled sample set in the corpus, the positive sample set indicates a sample set that is in the corpus and that belongs to a dictionary, and the unlabeled sample set indicates a sample set that is in the corpus and that does not belong to the dictionary, performing training, using the positive training set and the first negative training set, to obtain a first classification model, determining, using the first classification model, a pseudo negative sample in the first negative training set, where the pseudo negative sample indicates a sample that is in the first negative training set and that is considered as a positive sample, removing the pseudo negative sample from the first negative training set, updating the first negative training set to a second negative training set, and performing training, using the positive training set and the second negative training set, to obtain a second classification model, where the second classification model is a target classification model.

In this application, the target classification model is obtained through training based on the positive training set and the negative training set that is optimized for at least one time. Because the negative training set is optimized, accuracy of the classification model is also improved. Subsequently, when the target classification model is used to determine a category of the unlabeled sample, accuracy of category determining can also be improved. In addition, the solutions in this application do not require manual labeling.

Optionally, the positive training set includes some or all samples in the positive sample set, and the negative training set includes some or all samples in the unlabeled sample set.

With reference to the first aspect, in a possible implementation of the first aspect, the method further includes determining, using the target classification model, categories of all samples in the unlabeled sample set, and extending the dictionary based on a determining result.

Further, the target classification model is used to determine a category of an unlabeled dataset in a to-be-processed corpus, and add a word obtained by determining to a corresponding dictionary, thereby extending the dictionary. The corresponding dictionary is a dictionary that matches a type of the target classification model. For example, an emotion classification model corresponds to an emotion dictionary, and a dirty word classification model corresponds to a dirty word dictionary.

Therefore, in this application, the target classification model is obtained through training based on the positive training set and a negative training set that is optimized for at least one time. Because the negative training set is optimized, accuracy of the target classification model can be improved. Correspondingly, when the target classification model obtained in this application is used to determine a category of an unlabeled sample in a corpus, accuracy of determining a candidate word can be improved. A dictionary is extended based on the determining result to improve accuracy and reliability of the dictionary. In addition, in the solutions provided in this application, the dictionary can be extended without requiring manual labeling.

With reference to the first aspect, in a possible implementation of the first aspect, determining, using the first classification model, a pseudo negative sample in the first negative training set includes scoring, using the first classification model, all samples in the first negative training set, and determining a sample whose score exceeds a threshold in the first negative training set as the pseudo negative sample in the first negative training set.

Several methods for setting the threshold are as follows.

Method 1: Determine, as the threshold, a minimum score of samples ranking top k2% in terms of scores in descending order in the unlabeled samples included in the negative training set.

Method 2: Score probabilities of the unlabeled samples included in the negative training set, perform probability distribution fitting on the scores, and determine the threshold based on the probability fitting parameter.

Method 3: Determine, as a threshold $\theta$, a minimum score of samples ranking top k3% in terms of scores in descending order in the negative training set.

Method 4: Score probabilities of the samples included in the negative training set, perform probability distribution fitting on the scores, and determine the threshold based on the probability fitting parameter.

The first negative training set further includes at least one spy sample, the spy sample is a sample in a spy set, the spy set is a sample set that is populated by some samples in the positive sample set, and the positive training set does not include the spy set. A manner of determining the threshold may further be as follows. The threshold is determined based on a probability distribution fitting parameter for scores of spy samples included in the first negative training set, or the threshold is a minimum score of samples ranking top k1% in terms of scores in descending order in spy samples included in the first negative training set, where k1 is a positive integer.

It should be understood that, because the spy sample is a positive sample originally selected from the positive sample set, a threshold determined based on the spy sample (for example, the threshold is determined based on a probability distribution parameter for scores of the spy samples included in the first negative training set, or a minimum score of samples ranking top k1% in terms of scores in descending order in the spy samples included in the first negative training set is used as the threshold) may effectively distinguish and determine which samples in the first negative training set are the pseudo negative samples. Further, it is very likely that samples whose scores exceed the threshold in the first negative training set are pseudo negative samples (namely, positive samples), and the samples whose scores exceed the threshold are removed to effectively improve purity of the negative training set.

With reference to the first aspect, in a possible implementation of the first aspect, the pseudo negative sample in the first negative training set may be further determined in another feasible manner and based on the first classification model. For example, the first classification model is used to determine a category of the first negative training set, and all or some of samples whose determining results are positive samples are determined as pseudo negative samples in the first negative training set.

With reference to the first aspect, in a possible implementation of the first aspect, the obtaining a positive training set and a first negative training set includes obtaining the dictionary and the corpus, determining, based on the dictionary and the corpus, the positive sample set and the unlabeled sample set that are in the corpus, constructing, based on the positive sample set and the unlabeled sample set, the positive training set and an initial negative training set, where the initial negative training set indicates a negative training set that is directly obtained based on the corpus and that is not updated, and obtaining the first negative training set based on the initial negative training set, where the first negative training set is the initial negative training set, or the first negative training set is a negative training set obtained after the initial negative training set is updated.

In this application, the positive training set and the initial negative training set are automatically generated using an existing dictionary, and the initial negative training set is optimized for at least one time. Then, the target classification model is constructed based on the positive training set and a finally optimized negative training set, to improve accuracy of the target classification model. When the target classification model is used to determine the category of the unlabeled sample, accuracy of category determining can also be improved. In this application, manual labeling is not required, and therefore a problem in an existing machine learning classification method that a large amount of manual labeling is required can be resolved.

Optionally, in an implementation of constructing a training set, the positive training set is populated by the positive sample set, and the initial negative training set is populated by at least some unlabeled samples in the unlabeled sample set.

Optionally, in another implementation of constructing a training set, the positive sample set is divided into two parts of samples. One part of samples constitutes the positive training set, and the other part of samples is used as spy samples and these spy samples constitute a spy set. At least some unlabeled samples in the unlabeled sample set and the spy set constitute the initial negative training set.

In this application, the negative training set not only includes the unlabeled samples, but also includes the spy samples. In a process of continuously optimizing (iterating) the negative training set, a probability distribution status of the spy samples in the negative training set may be used to determine which samples in the negative training set are the pseudo negative samples, and the pseudo negative samples are removed. Finally, the target classification model is constructed using the positive training set and the finally optimized negative training set.

It should be understood that if the first negative training set is the initial negative training set, this is equivalent to that the negative training set is optimized for one time, and the target classification model is obtained through training based on a negative training set (a second negative training set) that is optimized for one time to improve accuracy of the classification model to some extent. In addition, in the solutions provided in this application, manual labeling is not required, and therefore a problem that a large amount of manual labeling is required is resolved.

It should also be understood that, when the first negative training set is a negative training set obtained after the initial negative training set is updated, this is equivalent to that the negative training set is optimized for two or more times. Finally, the target classification model is constructed based on the positive training set and a finally optimized negative training set, to further improve accuracy of the target classification model. When the target classification model is used to determine the category of the unlabeled sample, accuracy of category determining can also be improved, thereby improving accuracy and reliability of the dictionary. It should also be understood that in this application, because the negative training set is optimized for a plurality of times, accuracy of a final classification model does not depend on precision of the initial training set. In addition, the solutions in this application do not require manual labeling.

In an optional implementation, the first negative training set is a negative training set obtained after the initial negative training set is updated for one or more times.

In another optional implementation, the first negative training set may alternatively be a negative training set obtained after another feasible operation is performed on the initial negative training set, provided that the initial negative training set can be optimized. This is not limited in this application.

With reference to the first aspect, in a possible implementation of the first aspect, performing training, using the positive training set and the first negative training set, to obtain a first classification model includes determining that a termination condition is not met, and performing training, using the positive training set and the first negative training set, to obtain the first classification model, and performing training, using the positive training set and the second negative training set, to obtain a second classification model includes determining that the termination condition is met, and performing training, using the positive training set and the second negative training set, to obtain the second classification model, where the termination condition indicates a condition for terminating update of a current negative training set, and the current negative training set indicates a latest negative training set obtained when the termination condition is determined.

That is, each negative training set is obtained, and it is determined whether the termination condition is met, if the termination condition is not met, a classification model is obtained through training based on the negative training set, and the negative training set is continuously updated based on the classification model, if the termination condition is met, a final classification model is obtained through training based on the negative training set.

With reference to the first aspect, in a possible implementation of the first aspect, when the current negative training set includes at least one spy sample, the termination condition is that a sample capacity of a spy sample included in the current negative training set is less than a preset value, where the spy sample is a sample in the spy set, the spy set is a sample set that is constituted by some samples in the positive sample set, and the positive training set does not include the spy set.

In an optional implementation, the preset value is a sample capacity of N % of the samples in the spy set, and N % is a noise value of the spy set.

With reference to the first aspect, in a possible implementation of the first aspect, the termination condition is that a sample capacity of an unlabeled sample included in the current negative training set is less than a preset value, or the termination condition is that a sample capacity of the current negative training set is less than a preset value.

With reference to the first aspect, in a possible implementation of the first aspect, the termination condition is that a quantity of negative training set updates in a process of updating from an initial negative training set to the current negative training set exceeds a preset value.

In conclusion, this application provides a machine learning solution that is based on an unlabeled corpus. The training set is automatically generated using the existing dictionary, and the training set is optimized in the continuous iteration manner. Finally, the classification model is constructed based on an optimized training set. On one hand, accuracy of the classification model can be effectively improved, to improve accuracy of category determining when the classification model is used to determine the category of the unlabeled sample. On the other hand, a manual labeling process can be omitted.

According to a second aspect, a classification model training apparatus is provided, and the apparatus is configured to perform the method in any one of the first aspect or the possible implementations of the first aspect. Further, the apparatus may include a module configured to perform the method in any one of the first aspect or the possible implementations of the first aspect.

According to a third aspect, a classification model training apparatus is provided, and the apparatus includes a memory and a processor. The memory is configured to store an instruction, the processor is configured to execute the instruction stored in the memory, and executing the instruction stored in the memory enables the processor to perform the method in any one of the first aspect or the possible implementations of the first aspect.

According to a fourth aspect, a computer readable storage medium is provided, where the computer readable storage medium stores an instruction, and when the instruction is run on a computer, the computer is enabled to perform the method in any one of the first aspect or the possible implementations of the first aspect.

According to a fifth aspect, a computer program product including an instruction is provided, where when the computer program product is run on a computer, the computer is enabled to perform the method in any one of the first aspect or the possible implementations of the first aspect.

DESCRIPTION OF EMBODIMENTS

The following describes the technical solutions of this application with reference to accompanying drawings.

For clarity, terms used in this application are first explained.

1. Dictionary:

A dictionary may be a set of words with a common attribute. For example, words with an emotion feature populate an emotion dictionary, words with a dirty language feature populate a dirty word dictionary, and words representing a place name populate a place name dictionary.

Optionally, the dictionary in this application may also be a set of words in a specific field. For example, words in a religious field populate a religion dictionary, or words in a medical field populate a medical dictionary.

2. Corpus:

A corpus is also referred to as a free text, which may be a word, a phrase, a sentence, a paragraph, an article, or the like, or may be any combination thereof.

An unlabeled corpus is a corpus for which a category is not labeled, for example, a corpus for which an emotion category is not labeled.

A labeled corpus is a corpus for which a category is labeled, for example, a corpus for which an emotion category is labeled. Obtaining a labeled corpus means that the corpus may be obtained and the labeled category (for example, an emotion category) of the corpus may also be obtained.

3. Positive Sample:

A positive sample in this application is a sample in a corpus, where the sample and a sample in an existing dictionary have a common attribute or belong to a same field. That is, the positive sample is a sample that is in the corpus and that can be assigned to the existing dictionary.

4. Negative Sample:

A negative sample in this application is a sample in a corpus, where the sample does not belong to the existing dictionary. That is, the negative sample is a sample in the corpus, where the sample does not have an attribute required by the existing dictionary or belongs to a field different from that of the existing dictionary.

5. Positive Training Sample:

A positive training sample is a sample that is used as a to-be-detected target sample in a training set when a binary classifier is constructed. That is, the positive training sample is used to populate a positive training set. The positive training sample in this application is a sample that is in the corpus and that belongs to the existing dictionary.

6. Spy Sample:

In this application, a specific proportion of samples are extracted from a positive sample set as negative training samples, and these samples are referred to as spy samples. In this application, a set that is constituted by these spy samples is referred to as a spy set.

7. Negative Training Sample:

A negative training sample is a sample that is used as a non-to-be-detected target sample in a training set when a binary classifier is constructed. That is, the negative training sample is used to populate a negative training set.

In this application, an unlabeled sample in a corpus is used as a negative training sample, or a spy sample and an unlabeled sample are used as negative training samples.

8. Pseudo Negative Sample:

In this application, a pseudo negative sample is a sample that is in a negative training set and that is considered as a positive sample. Because the negative training set in the solution of this application is not obtained through manual labeling, it is likely that the negative training set implicitly includes a positive sample, namely, a pseudo negative sample. The solution provided in this application includes a process of updating a negative training set. In the process, the pseudo negative sample is continuously removed from the negative training set, to optimize the negative training set.

9. Classifier and Classification Model:

A classifier is a tool that uses various classification algorithms to label a category of a corpus. A classification model is a model that is generated by classifying a specific corpus by a classifier.

A typical application scenario of this application is construction and extension of a dictionary in NLP. For example, the dictionary is an emotion dictionary, a dirty word dictionary, a place name dictionary, a religion dictionary, a medical dictionary, or a dictionary in another field. These dictionaries may subsequently be used for related tasks in NLP, for example, the emotion dictionary is used for identifying emotions, and the dirty word dictionary is used for filtering out dirty languages.

Figure 1:
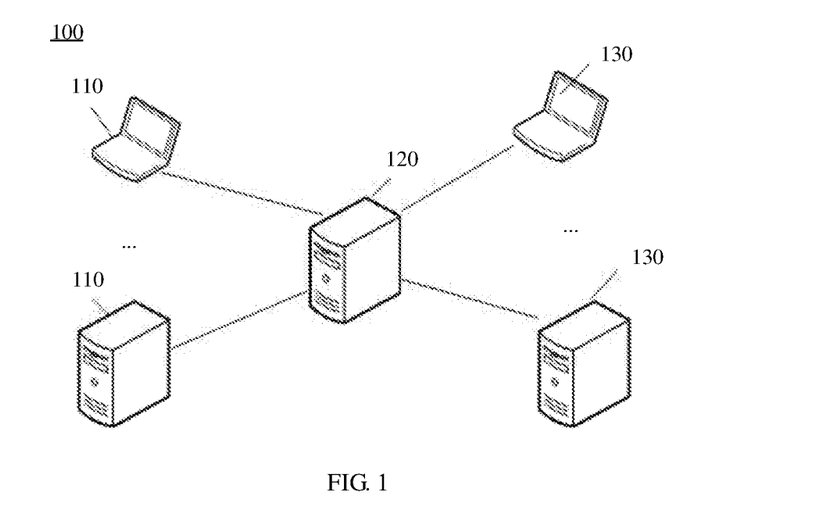
FIG. 1 is a schematic diagram of a system architecture according to an embodiment of this application.

FIG. 1 is a schematic diagram of a typical system architecture according to an embodiment of this application. A system 100 in this application includes a data collection device 110, a server device 120, and a client device 130, which are connected to each other using a communications network.

The data collection device 110 is configured to obtain to-be-processed data (for example, a dictionary and a to-be-processed corpus, or a positive training set and a negative training set), and transmit the to-be-processed data to the server device 120.

Further, the data collection device 110 obtains the to-be-processed data in a manner such as manual input or network searching.

The server device 120 is configured to process the data from the data collection device 110 and output a processing result to the client device 130.

The client device 130 is configured to perform, using the processing result from the server device 120, NLP. For example, the processing result from the server device 120 is an emotion analysis classification model, and the client device 130 uses the emotion classification model to identify types of emotions in a to-be-processed corpus, and adds an identified sample to an emotion dictionary. For another example, the processing result from the server device 120 is a dirty word classification model, and the client device 130 uses the dirty word classification model to identify types of dirty words in the to-be-processed corpus, and adds an identified sample to a dirty word dictionary.

Optionally, the data collection device 110, the server device 120, and the client device 130 may be three separate devices.

Optionally, functions of the data collection device 110, the server device 120, and the client device 130 are implemented in a same device. That is, the data collection device 110, the client device 130, and the server device 120 are essentially the same device.

Optionally, functions of the data collection device 110 and the server device 120 are implemented in a same device. That is, the data collection device 110 and the server device 120 are the same device. The client device 130 is a separate device.

Figure 2:
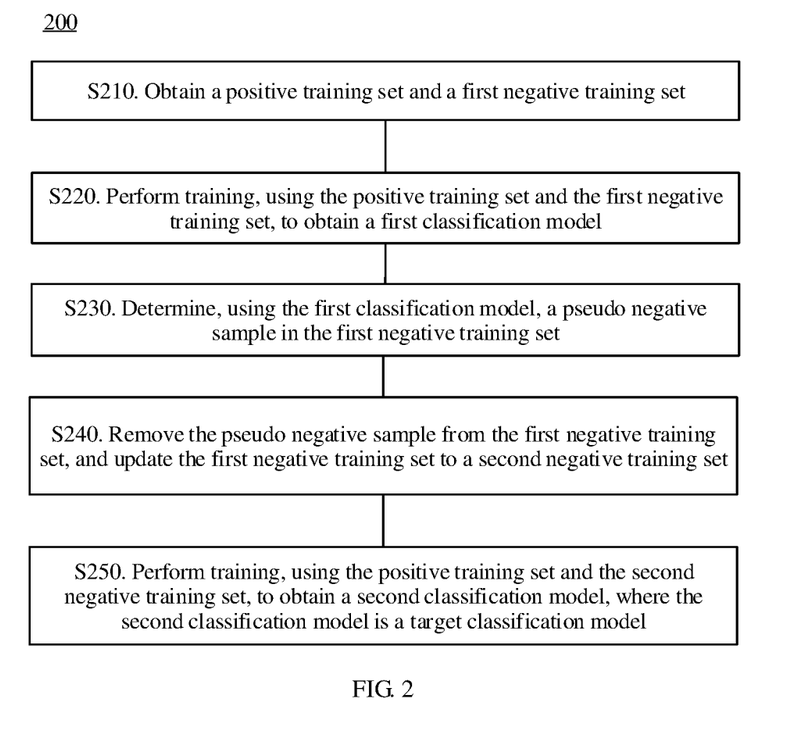
FIG. 2 is a schematic flowchart of a classification model training method according to an embodiment of this application.

FIG. 2 is a schematic flowchart of a classification model training method 200 according to an embodiment of this application. For example, the method 200 may be performed by the server device 120 shown in FIG. 1. As shown in FIG. 2, the method 200 includes the following steps.

Step S210. Obtain a positive training set and a first negative training set, where the positive training set includes samples of a positive sample set in a corpus, the positive sample set indicates a sample set that is in the corpus and that belongs to a dictionary, the first negative training set includes samples of an unlabeled sample set in the corpus, and the unlabeled sample set indicates a sample set that is in the corpus and that does not belong to the dictionary.

Further, the dictionary is used to scan the corpus, samples that are in the corpus and that belong to the dictionary are considered as positive samples, and these positive samples populate the positive sample set. Samples that are in the corpus and that do not belong to the dictionary are considered as unlabeled samples, and these unlabeled samples populate the unlabeled sample set. Then, the positive training set and an initial negative training set are constructed based on the positive sample set and the unlabeled sample set, where the positive training set includes some or all samples in the positive sample set, and the initial negative training set includes some or all samples in the unlabeled sample set. It should be noted that the first negative training set in this embodiment may be the initial negative training set, or may be a negative training set obtained after the initial negative training set is optimized. This is described in detail in the following.

For example, the dictionary in this embodiment may be an emotion dictionary, a sensitive word dictionary, a dirty word dictionary, or a dictionary in another field. Correspondingly, the corpus in this embodiment is a corpus that is related to a type of the dictionary. For example, when the dictionary is an emotion dictionary, the corpus is a microblog and commodity comment dataset or another dataset that includes an emotion type vocabulary. When the dictionary is a dirty word dictionary, the corpus is an Internet slang dataset or another dataset that possibly includes a dirty language.

It should be understood that a sample in the positive training set is referred to as a positive training sample, and a sample in the negative training set is referred to as a negative training sample.

It should be noted that, in comparison with a solution in the other approaches in which machine learning is used to extend a dictionary, in the solution of this application, a training set is obtained without requiring manual labeling.

Step S220. Perform training, using the positive training set and the first negative training set, to obtain a first classification model.

Further, a training feature is constructed based on the positive training set and the first negative training set. A supervised classification method during machine learning, for example, a machine learning algorithm such as a support vector machine (SVM) or a neural network is used to perform training to obtain a classification model. The training feature may be a word vector, a part of speech, and any other feature available for NLP. This is not limited in this application.

Step S230. Determine, using the first classification model, a pseudo negative sample in the first negative training set.

The pseudo negative sample is a sample that may be a positive sample in the first negative training set.

Further, the pseudo negative sample in the first negative training set is identified and determined using the first classification model. The following describes a detailed identification and determining method.

Step S240. Remove the pseudo negative sample from the first negative training set, and update the first negative training set to a second negative training set.

After the pseudo negative sample is removed from the first negative training set, the second negative training set is obtained. It should be understood that purity of the second negative training set is higher than that of the first negative training set, to be specific, the second negative training set is optimized relative to the first negative training set.

Step S250. Perform training, using the positive training set and the second negative training set, to obtain a second classification model, where the second classification model is a target classification model.

Further, based on the positive training set and the second negative training set, a machine learning algorithm such as an SVM or a neural network is used to train a classification model. A feature used during training may be a word vector, a part of speech, and any other feature available for NLP. This is not limited in this application.

In this embodiment, the target classification model is obtained through training based on the positive training set and a negative training set that is optimized for at least one time. Because the negative training set is optimized, accuracy of the classification model is also improved. Subsequently, when the target classification model is used to determine a category of the unlabeled sample, accuracy of category determining can also be improved. In addition, the solutions in this application do not require manual labeling.

Optionally, after the target classification model is obtained, the method 200 further includes determining, using the target classification model, categories of all samples in the unlabeled sample set, and extending the dictionary based on a determining result.

Further, the target classification model is used to determine a category of an unlabeled dataset in a to-be-processed corpus, and add a word obtained by determining to a corresponding dictionary, thereby extending the dictionary. The corresponding dictionary is a dictionary that matches a type of the target classification model. For example, an emotion classification model corresponds to an emotion dictionary, and a dirty word classification model corresponds to a dirty word dictionary.

An emotion dictionary is used as an example, and words in the emotion dictionary are words with an emotion. A finally obtained target classification model is an emotion classification model, and the target classification model is used to determine all unclassified words, and a word obtained by determining is added into the emotion dictionary, thereby obtaining an extended emotion dictionary.

Therefore, in this embodiment, the target classification model is obtained through training based on the positive training set and the negative training set that is optimized for at least one time. Because the negative training set is optimized, accuracy of the target classification model can be improved. Correspondingly, when the target classification model obtained in this application is used to determine a category of an unlabeled sample in a corpus, accuracy of determining a candidate word can be improved. A dictionary is extended based on the determining result, to improve accuracy and reliability of the dictionary. In addition, in the solutions provided in this application, the dictionary can be extended without requiring manual labeling.

Further, in step S210, an existing dictionary and a to-be-processed corpus are obtained, and a positive sample set and an unlabeled sample set that are in the corpus are obtained based on the corpus and the dictionary, where the positive sample set is a set of words that are in the corpus and that belong to the dictionary, and the unlabeled sample set is a set of words that are in the corpus and that do not belong to the dictionary. The positive training set and an initial negative training set are constructed based on the positive sample set and the unlabeled sample set, where the initial negative training set is a negative training set that is directly obtained based on the corpus and that is not updated, and the first negative training set is obtained based on the initial negative training set.

Optionally, in an embodiment, the first negative training set is the initial negative training set.

Further, the first negative training set is directly obtained based on the dictionary and the corpus. For example, a sample set that is constituted by all samples that are in the corpus and that do not belong to the dictionary is determined as the first negative training set, or some samples in the sample set are used as the first negative training set.

In this embodiment, a negative training set is optimized for one time, and the target classification model is obtained through training based on the negative training set (a second negative training set) that is optimized for one time, to improve accuracy of the classification model to some extent. In addition, in this embodiment, manual labeling is not required, and therefore a problem in the other approaches that a large amount of manual labeling is required is resolved.

Optionally, in another embodiment, the first negative training set is an updated negative training set, and the updated negative training set indicates a negative training set that is obtained after the initial negative training set is updated.

In an optional implementation, the first negative training set is a negative training set obtained after the initial negative training set is processed for one or more times by performing operations similar to steps S220 to S240.

For example, a classification model $M_1$ is obtained through training based on the positive training set and the initial negative training set, a pseudo negative sample is removed from the initial negative training set using the classification model $M_1$, and the initial negative training set is updated to a negative training set $P_1$, a classification model $M_2$ is obtained through training based on the positive training set and the negative training set $P_1$, a pseudo negative sample is removed from the negative training set $P_1$ using the classification model $M_2$, and the negative training set $P_1$ is updated to a negative training set $P_2$, by analogy, a classification model $M_n$ is obtained through training based on the positive training set and a negative training set $P_{n-1}$, a pseudo negative sample is removed from the negative training set $P_{n-1}$ using the classification model $M_n$, the negative training set $P_{n-1}$ is updated to a negative training set $P_n$ (n is an integer greater than 2), and then the negative training set $P_n$ is determined as the first negative training set. In this example, the first negative training set is a negative training set that is obtained after the initial negative training set is updated for n times (n is an integer greater than 2), and a value of n may be set according to an actual requirement. It should be understood that, for example, the negative training set $P_1$ in the foregoing example may alternatively be determined as a first negative training set, to be specific, the first negative training set is a negative training set that is obtained after the initial negative training set is updated for one time. For another example, the negative training set $P_2$ in the foregoing example may alternatively be determined as the first negative training set, to be specific, the first negative training set is a negative training set that is obtained after the initial negative training set is updated for two times.

In another optional implementation, the first negative training set may alternatively be a negative training set obtained after another feasible operation is performed on the initial negative training set, provided that the initial negative training set can be optimized. This is not limited in this embodiment of this application.

In this embodiment, after the positive training set and the initial negative training set are obtained, the negative training set is optimized in a continuous iteration manner. Finally, the target classification model is constructed based on the positive training set and a finally optimized negative training set, to further improve accuracy of the target classification model. When the target classification model is used to determine the category of the unlabeled sample, accuracy of category determining can also be improved, thereby improving accuracy and reliability of the dictionary. It should also be understood that in this embodiment, because the negative training set is optimized for a plurality of times, accuracy of a final classification model does not depend on precision of the initial training set. In addition, the solutions in this embodiment do not require manual labeling.

In conclusion, in this embodiment, the positive training set and the initial negative training set are automatically generated using an existing dictionary, and the initial negative training set is optimized for at least one time. Then, the target classification model is constructed based on the positive training set and the finally optimized negative training set, to improve accuracy of the target classification model. When the target classification model is used to determine the category of the unlabeled sample, accuracy of category determining can also be improved. In this embodiment, manual labeling is not required, and therefore a problem in an existing machine learning classification method that a large amount of manual labeling is required can be resolved.

An emotion dictionary is used as an example, and words in the emotion dictionary are determined words with an emotion. A sample set that is in the to-be-processed corpus and that belongs to the emotion dictionary is determined as the positive training set, and the negative training set is determined based on a sample (namely, an unclassified sample) that is in the to-be-processed corpus and that does not belong to the emotion dictionary. The classification model is constructed based on the positive training set and the negative training set, then, a sample that may be a positive sample is gradually removed from the negative training set in the continuous iteration manner, to improve purity of the negative training set. Finally, the target classification model is constructed based on the positive training set and an optimal negative training set, and it should be understood that the target classification model is the emotion classification model. The target classification model is used to determine all unclassified words, and a word obtained by determining is added into the emotion dictionary, thereby obtaining the extended emotion dictionary. Similarly, extension of the dirty word dictionary or a dictionary in another field and identification of a field named entity may be designed and implemented according to this solution.

Optionally, in an implementation of constructing a positive training set and an initial negative training set, the positive training set is constituted by the positive sample set, and the initial negative training set is constituted by at least some unlabeled samples in the unlabeled sample set.

Optionally, in another implementation of constructing a positive training set and an initial negative training set, the positive sample set is divided into two parts of samples. One part of samples constitutes the positive training set, and the other part of samples is used as spy samples and these spy samples populate a spy set. At least some unlabeled samples in the unlabeled sample set and the spy set populate the initial negative training set.

It should be understood that in actual application, if the to-be-processed corpus is very large, a quantity of the unlabeled samples included in the to-be-processed corpus is also large, in this case, the negative training set may be determined based on some rather than all of the unlabeled samples. If the to-be-processed corpus is not very large, a quantity of the unlabeled samples included in the to-be-processed corpus is not very large, in this case, the negative training set may be determined based on all the unlabeled samples in the corpus. A set of all unlabeled samples included in a corpus may be referred to as an unlabeled set of the corpus.

In this embodiment, the negative training set not only includes the unlabeled samples, but also includes the spy samples. In a process of continuously optimizing (iterating) the negative training set, a probability distribution status of the spy samples in the negative training set may be used to determine which samples in the negative training set are pseudo negative samples, and the pseudo negative samples are removed. Finally, the target classification model is constructed using the positive training set and the finally optimized negative training set.

In an optional implementation, the positive training set and the initial negative training set in some of the foregoing embodiments may be alternatively obtained through manual coarse labeling. That is, the initial negative training set obtained through manual labeling is allowed to include some pseudo negative samples.

It can be learned that in this application, the positive training set and a negative training set that is optimized for at least one time are used to train the classification model, to reduce dependency on precision (purity) of the initial training set for accuracy of the classification model. Therefore, in this application, without manual labeling, the training set for training the classification model does not greatly affect accuracy of the classification model.

Further, in step S230, there may be a plurality of implementations in which the first classification model is used to determine the pseudo negative sample in the first negative training set.

Optionally, in step S230, determining, using the first classification model, a pseudo negative sample in the first negative training set includes scoring, using the first classification model, all samples in the first negative training set, and determining a sample whose score exceeds a threshold in the first negative training set as the pseudo negative sample in the first negative training set.

Further, a specific manner of scoring a sample using the classification model may be that a specific sample is scored by predicting a probability of the specific sample, or a specific sample is scored by calculating a distance between the specific sample and a known sample.

Further, a manner of determining the threshold may be as follows. (1) A minimum score of samples ranking top k2% in terms of scores in descending order in the unlabeled samples included in the first negative training set is determined as the threshold, where k2 is an integer, (2) a minimum score of samples ranking top k3% in terms of scores in descending order in the first negative training set is determined as the threshold, where k3 is an integer, (3) the threshold is determined based on a probability distribution fitting parameter for scores of the unlabeled samples included in the first negative training set, or (4) the threshold is determined based on a probability distribution fitting parameter for scores of the samples included in the first negative training set, where the mentioned probability distribution fitting parameter may be a mean and a variance that are of Gaussian distribution.

In some embodiments, the first negative training set further includes at least one spy sample, the spy sample is a sample in the spy set, the spy set is a sample set that is constituted by some samples in the positive sample set, and the positive training set does not include the spy set. In this case, a manner of determining the threshold may further be as follows. (5) The threshold is determined based on a probability distribution fitting parameter for scores of the spy samples included in the first negative training set, for example, the probability distribution fitting parameter is a mean and a variance that are of Gaussian distribution, or (6) a minimum score of samples ranking top k1% in terms of scores in descending order in the spy samples included in the first negative training set is determined as the threshold, where k1 is an integer.

Further, the dictionary and the to-be-processed corpus are obtained. The dictionary is used to scan the corpus to obtain a positive sample set and an unlabeled sample set that are of the corpus, some samples in the positive sample set are determined as the positive training set, and some remaining samples in the positive sample set are determined as the spy samples to constitute the spy set, at least some samples in the unlabeled sample set and the spy set are determined as an initial negative training set, that is, the initial negative training set includes a spy sample and an unlabeled sample. The first negative training set in this embodiment may be the initial negative training set, or may be a negative training set obtained after the initial negative training set is updated (optimized) for one or more times.

In this embodiment, step S230 and S240 further include scoring, using the first classification model, all samples in the first negative training set, removing, from the spy samples included in the first negative training set, a sample whose score exceeds the threshold, and removing, from the unlabeled samples included in the first negative training set, a sample whose score exceeds the threshold, to update the first negative training set to the second negative training set.

It should be understood that, because the spy sample is a positive sample originally selected from a positive sample set, a threshold determined based on the spy sample (for example, the threshold is determined based on a probability distribution parameter for scores of the spy samples included in the first negative training set, or a minimum score of samples ranking top k1% in terms of scores in descending order in the spy samples included in the first negative training set is used as the threshold) may effectively distinguish and determine which samples in the first negative training set are pseudo negative samples. Further, it is very likely that samples whose scores exceed the threshold in the first negative training set are pseudo negative samples (namely, positive samples), and therefore these samples whose scores exceed the threshold are removed, to effectively improve purity of the negative training set.

It should be understood that, in step S230, the pseudo negative sample in the first negative training set may be further determined in another feasible manner and based on the first classification model. For example, the first classification model is used to determine a category of the first negative training set, and all or some of samples whose determining results are positive samples are determined as pseudo negative samples in the first negative training set.

Further, in the embodiments of this application, after the negative training set is obtained, whether to continue to optimize the negative training set or obtain the target classification model through training based on a current negative training set is determined by determining a termination condition.

Optionally, in some embodiments, in step S220, it is determined that the termination condition is not met, and the first classification model is obtained through training based on the positive training set and the first negative training set, in step S250, it is determined that the termination condition is met, and the second classification model is obtained through training based on the positive training set and the second negative training set.

That is, each negative training set is obtained, and it is determined whether the termination condition is met, if the termination condition is not met, a classification model is obtained through training based on the negative training set, and the negative training set is continuously updated based on the classification model, if the termination condition is met, a final classification model is obtained through training based on the negative training set.

Further, the termination condition indicates a condition for terminating update of a current negative training set, and the current negative training set indicates a latest negative training set obtained when the termination condition is determined. For example, in step S220, the current negative training set indicates the first negative training set, and in step S250, the current negative training set indicates the second negative training set.

In this application, the termination condition may include the following several definitions.

In a first termination condition, a quantity of negative training set updates in a process of updating from the initial negative training set to the current negative training set exceeds a preset value. The preset value may be determined based on an empirical value or a related algorithm.

In a second termination condition, a sample capacity of an unlabeled sample included in the current negative training set is less than a preset value. The preset value may be determined based on an empirical value or a related algorithm.

In a third termination condition, a sample capacity of the current negative training set is less than a preset value. The preset value may be determined based on an empirical value or a related algorithm.

When the current negative training set includes at least one spy sample, the termination condition may further be the following definition manner.

In a fourth termination condition, a sample capacity of a spy sample included in the current negative training set is less than a preset value. Further, the preset value is a sample capacity of N % of samples in the spy set, and N % is a noise value of the spy set.

It should be understood that the solution provided in this application may be applied to a scenario in which a large quantity of related corpuses are used to extend the dictionary, for example, a corpus constituted by a microblog or commodity comment data is used to extend the emotion dictionary or the dirty word dictionary.

Figure 3:
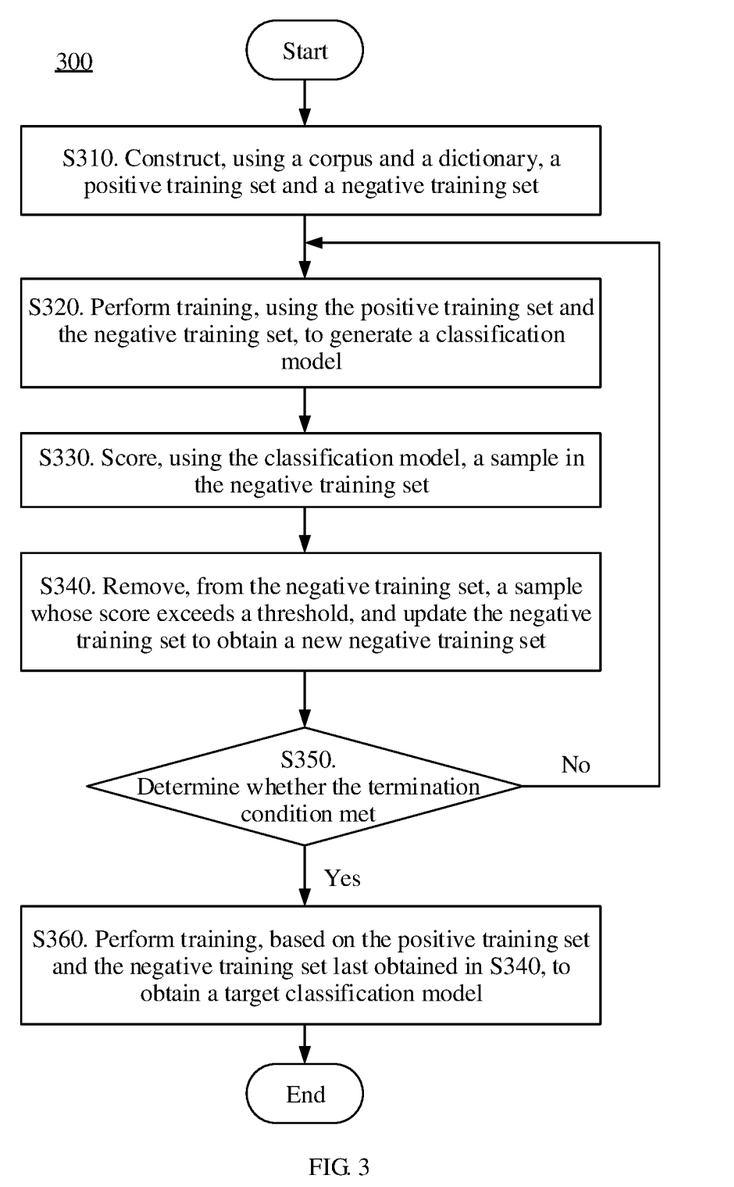
FIG. 3 is another schematic flowchart of a classification model training method according to an embodiment of this application.

FIG. 3 is another schematic flowchart of a classification model training method 300 according to an embodiment of this application. The method 300 includes the following steps.

Step S310. Construct, using a corpus and a dictionary, a positive training set and a negative training set.

Further, a positive sample set of the corpus is generated using the dictionary, and a specific proportion of samples are randomly selected from the positive sample set as spy samples, to populate a spy set, the positive training set is constructed using remaining samples in the positive sample set, and an unlabeled sample set of the corpus is generated using the dictionary, and the negative training set is constructed using at least some samples in the unlabeled sample set and the spy set.

That the positive sample set of the corpus is generated using the dictionary indicates that the positive sample set is constituted by all words that are in the corpus and that appear in the dictionary. That the unlabeled sample set of the corpus is generated using the dictionary indicates that the unlabeled sample set is constituted by all words that are in the corpus and that do not appear in the dictionary. It should be understood that the unlabeled sample set is a to-be-determined dataset, namely, a dataset subsequently used to extend the dictionary.

The dictionary in this example may be an existing emotion dictionary, for example, an emotion ontology library of Dalian University of Technology, the corpus may be a large quantity of datasets that are constituted by data including emotion words such as microblog or commodity comment data. Alternatively, the dictionary in this example may be an existing dirty word dictionary, correspondingly, the corpus may be an Internet slang dataset, or may be a large quantity of datasets that are constituted by other data including an emotion vocabulary.

Step S320. Perform training, using the positive training set and the negative training set, to generate a classification model.

Further, based on the positive training set and the negative training set, a machine learning algorithm such as an SVM or a neural network is used to train the classification model. A feature used during training may be a word vector, a part of speech, and any other feature available for NLP. This is not limited in this application.

Step S330. Score, using the classification model, a sample in the negative training set.

Further, the classification model is used to score a spy sample and an unlabeled sample that are in the negative training set.

Further, the classification model is used to score a predicted probability for a sample in the negative training set.

Step S340. Remove, from the negative training set, a sample whose score exceeds a threshold, and update the negative training set to obtain a new negative training set.

Further, a threshold θ is set, a sample whose score exceeds the threshold θ is removed from the unlabeled samples in the negative training set, and a sample whose score exceeds the threshold θ is removed from spy samples in the negative training set, to update the negative training set to obtain the new negative training set. It should be understood that, in the negative training set, a sample with a higher score is more likely to be not an authentic negative sample than a sample with a lower score. Therefore, a sample whose score exceeds the threshold θ is removed from the negative training set, to obtain a relatively pure negative training set. That is, the negative training set may be optimized.

Several methods for setting the threshold θ are as follows.

Method 1: Determine, as the threshold θ, a minimum score of samples ranking top k1% in terms of scores in descending order in the spy samples included in the negative training set.

Method 2: Score probabilities of the spy samples included in the negative training set, perform probability distribution fitting on the scores, and determine the threshold θ based on the probability fitting parameter.

For example, probabilities of the spy samples included in the negative training set are scored, Gaussian distribution fitting is performed on the scores, and the threshold θ=μ+σ is determined based on a mean μ and a variance σ that are of Gaussian fitting.

Method 3: Determine, as the threshold θ, a minimum score of samples ranking top k2% in terms of scores in descending order in the unlabeled samples included in the negative training set.

Method 4: Score probabilities of the unlabeled samples included in the negative training set, perform probability distribution fitting on the scores, and determine the threshold θ based on the probability fitting parameter.

Method 5: Determine, as the threshold θ, a minimum score of samples ranking top k3% in terms of scores in descending order in the negative training set.

Method 6: Score probabilities of the samples included in the negative training set, perform probability distribution fitting on the scores, and determine the threshold θ based on the probability fitting parameter.

Step S350. Determine whether the termination condition is met, if the termination condition is not met, go to step S320, if the termination condition is met, go to step S360.

It should be noted that, after going to S320, the negative training set in S320 needs to be updated to the new negative training set obtained in S340. That is, if the termination condition is not met, an iteration process of the negative training set is performed for one time, and each iteration process includes steps S320 to S340. In the iteration process, the negative training set in step S320 is an initial iteration value of the current iteration, and the negative training set obtained in step S340 is an iteration result of the current iteration. An iteration result of each iteration (the negative training set obtained in step S340) is an initial value of a next iteration (the negative training set in step S320). It should also be understood that a sample that may be a positive sample is removed from the negative training set during each iteration, where the threshold θ is used to determine whether the negative training set may include the positive sample.

The termination condition includes the following several definitions.

Definition 1: When a noise value of the spy set is set to N % (N is an integer), and a sample capacity of a spy sample in a current negative training set is less than a sample capacity of the N % of samples in the spy set, the iteration stops.

Further, a sample attribute of the N % of samples in the spy set is ambiguous, that is, the samples are not exact positive samples. The samples cannot serve well as a spy to guide screening of the negative training set. As a quantity of iteration times increases, when a sample capacity of remaining spy samples in the negative training set is less than N % of a sample capacity of the spy set, it is considered that the remaining spy samples in the negative training set include much noise, and the iteration stops.

Definition 2: A quantity of iteration times of the negative training set exceeds a maximum quantity of iteration times, and the iteration stops.

Definition 3: A sample capacity of unlabeled samples included in a current negative training set is less than a preset value, and the iteration stops.

Definition 4: A sample capacity of a current negative training set is less than a preset value, and the iteration stops.

Step S360. Perform training, based on the positive training set and the negative training set last obtained in S340, to obtain a target classification model.

Optionally, the method 300 further includes determining, using the target classification model, a category of a sample in an unlabeled sample set in a corpus, and extending a dictionary based on a determining result.

A training set is automatically generated using an existing dictionary and a large quantity of unlabeled corpuses, and the training set is optimized in a continuous iteration manner, to improve accuracy of determining a candidate word. As a quantity of iteration times increases, the accuracy is continually improved. After testing, a microblog corpus and an emotion ontology library of Dalian University of Technology are used as existing words to identify emotion words, and accuracy reaches 67.4%. Accuracy is greatly improved compared with an existing method.

In this embodiment, the positive training set and the negative training set are automatically generated using the existing dictionary, and the negative training set is optimized in the continuous iteration manner. Finally, the target classification model is constructed based on the positive training set and the finally optimized negative training set, to improve accuracy of the target classification model. When the target classification model is used to determine the category of the unlabeled sample, accuracy of category determining can also be improved. In addition, in this embodiment, manual labeling is not required, and therefore a problem in an existing machine learning classification method that a large amount of manual labeling is required can be resolved.

In conclusion, this application provides a machine learning solution that is based on an unlabeled corpus. The training set is automatically generated using the existing dictionary, and the training set is optimized in the continuous iteration manner. Finally, the classification model is constructed based on an optimized training set. On one hand, accuracy of the classification model can be effectively improved, to improve accuracy of category determining when the classification model is used to determine the category of the unlabeled sample. On the other hand, a manual labeling process can be omitted.

It should be understood that, with reference to some embodiments, the foregoing describes a detailed operation of applying the technical solutions of this application to extension of an emotion dictionary. However, an application scope of this application is not limited to extension of the emotion dictionary. The technical solutions provided in this application are also applicable to extension of a dirty word dictionary or a dictionary in another field. In addition, identification of a field named entity may be designed and implemented based on the technical solutions provided in this application.

The foregoing describes a classification model training method provided in the embodiments of this application, and the following describes a classification model training apparatus provided in the embodiments of this application.

Figure 4:
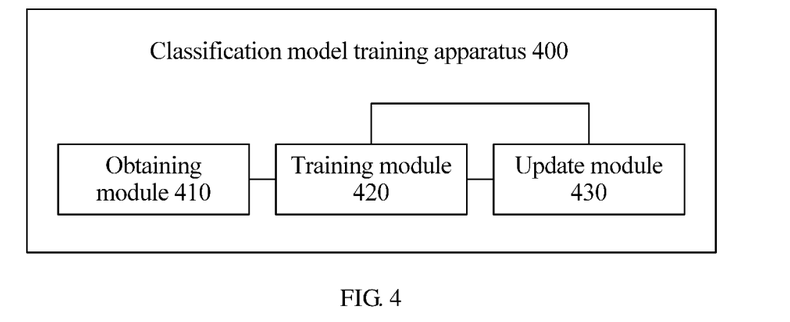
FIG. 4 is a schematic block diagram of a classification model training apparatus according to an embodiment of this application.

FIG. 4 is a schematic block diagram of a classification model training apparatus 400 according to an embodiment of this application. The apparatus 400 includes the following modules.

An obtaining module 410 is configured to obtain a positive training set and a first negative training set, where the positive training set includes samples of a positive sample set in a corpus, the first negative training set includes samples of an unlabeled sample set in the corpus, the positive sample set indicates a sample set that is in the corpus and that belongs to a dictionary, and the unlabeled sample set indicates a sample set that is in the corpus and that does not belong to the dictionary.

A training module 420 is configured to perform training, using the positive training set and the first negative training set that are obtained by the obtaining module 410, to obtain a first classification model.

An update module 430 is configured to determine, using the first classification model obtained by the training module 420, a pseudo negative sample in the first negative training set, where the pseudo negative sample indicates a sample that is in the first negative training set and that is considered as a positive sample, remove the pseudo negative sample from the first negative training set, and update the first negative training set to a second negative training set.

The training module 420 is further configured to perform training, using the positive training set and the second negative training set that is obtained by the update module 430, to obtain a second classification model, where the second classification model is a target classification model.

In this embodiment, the target classification model is obtained through training based on the positive training set and a negative training set that is optimized for at least one time. Because the negative training set is optimized, accuracy of the classification model is also improved. Subsequently, when the target classification model is used to determine a category of an unlabeled sample, accuracy of category determining can also be improved. In addition, the solutions in this application do not require manual labeling.

Optionally, in an embodiment, the update module 430 is further configured to score, using the first classification model, all samples in the first negative training set, and determine a sample whose score exceeds a threshold in the first negative training set as the pseudo negative sample in the first negative training set.

Optionally, in an embodiment, the first negative training set further includes at least one spy sample, the spy sample is a sample in a spy set, the spy set is a sample set that is constituted by some samples in the positive sample set, and the positive training set does not include the spy set, the threshold is determined based on a probability distribution fitting parameter for scores of spy samples included in the first negative training set, alternatively, the threshold is a minimum score of samples ranking top k1% in terms of scores in descending order in spy samples included in the first negative training set, where k1 is a positive integer.

Optionally, in an embodiment, the threshold is a minimum score of samples ranking top k2% in terms of scores in descending order in unlabeled samples included in the first negative training set, where k2 is a positive integer, alternatively, the threshold is a minimum score of samples ranking top k3% in terms of scores in descending order in the first negative training set, where k3 is a positive integer.

Optionally, in an embodiment, the obtaining module 410 is further configured to obtain the dictionary and the corpus, determine, based on the dictionary and the corpus, the positive sample set and the unlabeled sample set that are in the corpus, use some samples in the positive sample set as spy samples to populate the spy set, populate the positive training set using some remaining samples in the positive sample set, populate an initial negative training set using the unlabeled sample set and the spy set, where the initial negative training set indicates a negative training set that is directly obtained based on the corpus and that is not updated, and obtain the first negative training set based on the initial negative training set, where the first negative training set is the initial negative training set, or the first negative training set is a negative training set obtained after the initial negative training set is updated.

Optionally, in an embodiment, the training module 420 is further configured to after obtaining the first negative training set, determine that the termination condition is not met, and perform training, using the positive training set and the first negative training set, to obtain the first classification model, after obtaining the second negative training set, determine that the termination condition is met, perform training, using the positive training set and the second negative training set, to obtain the second classification model, where the termination condition indicates a condition for terminating update of a current negative training set, and the current negative training set indicates a latest negative training set obtained when the termination condition is determined.

Optionally, in an embodiment, when the current negative training set includes at least one spy sample, the termination condition is that a sample capacity of a spy sample included in the current negative training set is less than a preset value, the spy sample is a sample in the spy set, the spy set is a sample set that is constituted by some samples in the positive sample set, and the positive training set does not include the spy set.

Optionally, in an embodiment, the preset value is a sample capacity of N % of samples in the spy set, and N % is a noise value of the spy set.

Optionally, in an embodiment, the termination condition is that a sample capacity of an unlabeled sample included in the current negative training set is less than a preset value, or the termination condition is that a sample capacity of the current negative training set is less than a preset value, or the termination condition is that a quantity of negative training set updates in a process of updating from the initial negative training set to the current negative training set exceeds a preset value.

Optionally, in an embodiment, the apparatus 400 further includes a dictionary extension module (not shown) configured to determine, using the target classification model, categories of all samples in the unlabeled sample set, and extend the dictionary based on a determining result.

Further, all modules of the classification model training apparatus 400 provided in this embodiment of this application may be implemented by a processor or a processor-related circuit component. The apparatus 400 may further include a memory (not shown). The memory stores an instruction, and the processor performs, by executing the instruction stored in the memory, actions of the modules in the apparatus 400.

Figure 5:
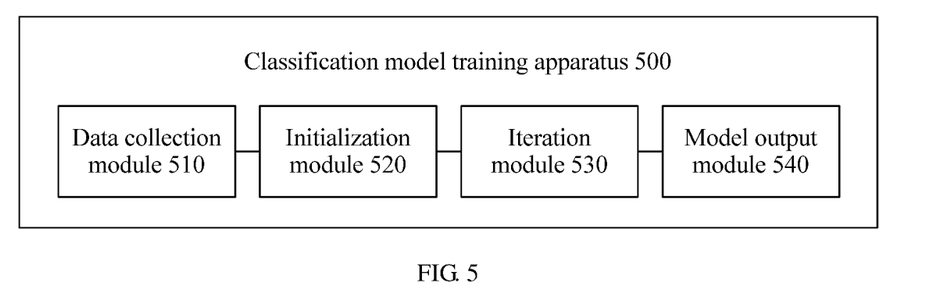
FIG. 5 is another schematic block diagram of a classification model training apparatus according to an embodiment of this application.

FIG. 5 is another schematic block diagram of a classification model training apparatus 500 according to an embodiment of this application. The apparatus 500 includes the following modules.

A data collection module 510 is configured to obtain a dictionary and a to-be-processed corpus.

An initialization module 520 is configured to obtain the dictionary and the corpus from the data collection module 510, and obtain, based on the dictionary and the corpus, a positive training set and an initial negative training set.

Further, a positive sample set and an unlabeled sample set are obtained based on the dictionary and the corpus, some samples in the positive sample set are considered as spy samples, and these spy samples populate a spy set, some remaining samples in the positive sample set are used as a positive training set, some or all of samples in the unlabeled sample set and the spy set are used as the initial negative training set.

An iteration module 530 is configured to obtain the positive training set and the initial negative training set from the initialization module 520, and perform loop iteration based on the positive training set and the initial negative training set until a termination condition is met, to output an optimal negative training set. Each iteration in the loop iteration includes the following steps.

Step 1. Perform training, based on the positive training set and a first negative training set, to obtain a classification model.

Step 2. Determine, using the classification model, a pseudo training set in the first negative training set, and remove a pseudo negative sample from the first negative training set, and update the first negative training set to obtain a second negative training set.

In the first iteration, the first negative training set in step 1 is the initial negative training set obtained by the initialization module 520. From the first iteration (including the first iteration), a negative training set obtained in each iteration, namely, the second negative training set obtained in step 2, is used as an input negative training set in a next iteration, namely, the first negative training set in step 1.

After step 2 of each iteration, it is determined whether the termination condition is met, if the termination condition is not met, the loop iteration continues, if the termination condition is met, the second negative training set obtained in step 2 of the latest iteration is determined as the optimal negative training set.

A model output module 540 is configured to obtain, from the iteration module 530, the positive training set and the optimal negative training set, and perform training, based on the positive training set and the optimal negative training set, to obtain an optimal classification model, namely, the target classification model in the foregoing method embodiments.

Optionally, the apparatus 500 further includes a dictionary extension module (not shown) configured to determine, using the optimal classification model obtained by the model output module 540, a category of an unlabeled sample set in the corpus, and extend the dictionary based on a determining result.

Further, all modules of the classification model training apparatus 500 provided in this embodiment of this application may be implemented by a processor (not shown) or a processor-related circuit component (not shown). The apparatus 500 may further include a memory (not shown), the memory stores an instruction, and the processor performs, by executing the instruction stored in the memory, actions of the modules in the apparatus 500.

Figure 6:
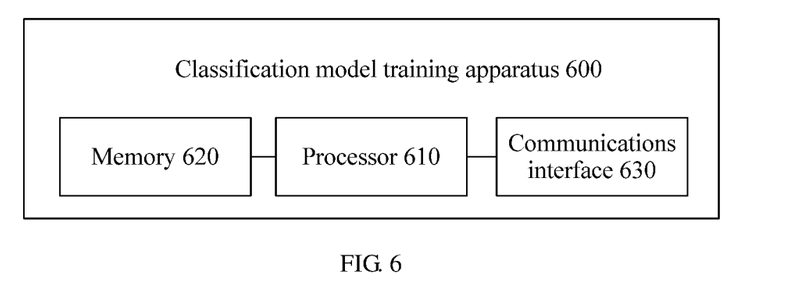
FIG. 6 is yet another schematic block diagram of a classification model training apparatus according to an embodiment of this application.

As shown in FIG. 6, an embodiment of this application further provides a classification model training apparatus 600. The apparatus 600 includes a processor 610, a memory 620, and a communications interface 630, the memory 620 stores an instruction, the processor 610 is configured to execute the instruction in the memory 620, when the instruction is executed, the processor 610 is configured to perform the methods provided in the foregoing method embodiments and the processor 610 is further configured to control the communications interface 630 to communicate with the outside.

It should be understood that the apparatus 400 shown in FIG. 4, the apparatus 500 shown in FIG. 5, and the apparatus 600 shown in FIG. 6 may be configured to perform operations or procedures in the foregoing method embodiments, and operations and/or functions of the modules in the apparatus 400, the apparatus 500, or the apparatus 600 are respectively intended to implement corresponding procedures in the foregoing method embodiments. Details are not described herein for brevity.

An embodiment of this application further provides a computer readable storage medium, the computer readable storage medium includes a computer program, when the computer program is run on a computer, the computer is enabled to perform the methods provided in the foregoing method embodiments.

An embodiment of this application further provides a computer program product including an instruction, when the computer program product is run on a computer, the computer is enabled to perform the methods provided in the foregoing method embodiments.

It should be understood that, the processor mentioned in the embodiments of this application may be a central processing unit (CPU), or may be another general-purpose processor, a digital signal processor (DSP), an application-specific integrated circuit (ASIC), or a field programmable gate array (FPGA), or another programmable logic device, discrete gate, transistor logic device, discrete hardware component, or the like. The general-purpose processor may be a microprocessor, or the processor may be any conventional processor or the like.

It may be understood that the memory mentioned in the embodiments of this application may be a volatile memory or a non-volatile memory, or may include a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), used as an external cache. Through examples but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a Direct Rambus (DR) RAM.

It should be noted that when the processor is a general-purpose processor, a DSP, an ASIC, an FPGA, or another programmable logic device, discrete gate, transistor logic device, or discrete hardware component, the memory (storage module) is integrated into the processor.

It should be noted that the memory described in this specification is intended to include but not limited to these memories and any memory of another proper type.

It should be further understood that the first, the second, and various numbers in this specification are merely used for differentiation for ease of description, and are not construed as a limitation on the scope of this application.

A person of ordinary skill in the art may be aware that, in combination with the examples described in the embodiments disclosed in this specification, units and algorithm steps may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the other approaches, or some of the technical solutions may be implemented in a form of a software product. The computer software product is stored in a storage medium, and includes instructions for instructing a computer device (which may be a personal computer, a server, a network device, or the like) to perform all or some of the steps of the methods described in the embodiments of this application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A classification model training method, comprising:
    obtaining a positive training set and a first negative training set, wherein the positive training set comprises samples of a positive sample set in a corpus, wherein the first negative training set comprises samples of an unlabeled sample set in the corpus, wherein the positive sample set belongs to a dictionary, and wherein the unlabeled sample set does not belong to the dictionary;
    training, using the positive training set and the first negative training set, to obtain a first classification model;
    obtaining, using the first classification model, a pseudo negative sample in the first negative training set, wherein the pseudo negative sample is a positive sample;
    removing the pseudo negative sample from the first negative training set to obtain a second negative training set; and
    training, using the positive training set and the second negative training set, to obtain a second classification model, wherein the second classification model is a target classification model.

2. The classification model training method of claim 1, wherein determining the pseudo negative sample comprises:
    scoring, using the first classification model, all samples in the first negative training set; and
    determining a sample with a score higher than a threshold in the first negative training set as the pseudo negative sample in the first negative training set.

3. The classification model training method of claim 2, wherein the first negative training set further comprises at least one spy sample, wherein the at least one spy sample is in a spy set, wherein the spy set comprises a plurality of samples from the positive sample set, wherein the positive training set does not comprise the spy set, and wherein the threshold is either:
    based on a probability distribution fitting parameter for scores of spy samples comprised in the first negative training set; or
    a minimum score of samples ranking top k1% in terms of scores in a descending order in the spy samples, wherein k1 is a positive integer.

4. The classification model training method of claim 2, wherein the threshold is either:
    a minimum score of samples ranking top k2% in terms of scores in a first descending order in unlabeled samples comprised in the first negative training set, wherein k2 is a first positive integer; or
    a minimum score of samples ranking top k3% in terms of scores in a second descending order in the first negative training set, wherein k3 is a second positive integer.

5. The classification model training method of claim 1, wherein obtaining the positive training set and the first negative training set comprises:
    obtaining the dictionary and the corpus;
    determining, based on the dictionary and the corpus, the positive sample set and the unlabeled sample set;
    setting a plurality of first samples in the positive sample set as spy samples to constitute a spy set;
    populating the positive training set using a plurality of second samples in the positive sample set, wherein the first samples and the second samples are different;
    populating an initial negative training set using the unlabeled sample set and the spy set, wherein the initial negative training set is based on the corpus and not updated; and
    obtaining the first negative training set based on the initial negative training set, wherein the first negative training set is either the initial negative training set or a negative training set obtained after the initial negative training set is updated.

6. The classification model training method of claim 1, wherein training to obtain the first classification model comprises:

determining that a termination condition is not met; and
training, using the positive training set and the first negative training set, to obtain the first classification model,
wherein training to obtain the second classification model comprises:
  determining that the termination condition is met; and
  training, using the positive training set and the second negative training set, to obtain the second classification model,
wherein the termination condition indicates a condition for terminating update of a current negative training set, and
wherein the current negative training set indicates a latest negative training set obtained when the termination condition is determined.

7. The classification model training method of claim 6, wherein the termination condition comprises that a sample capacity of a spy sample comprised in the current negative training set is less than a preset value when the current negative training set comprises at least one spy sample, wherein the at least one spy sample is in a spy set, wherein the spy set is constituted by a plurality of samples in the positive sample set, and wherein the positive training set does not comprise the spy set.

8. The classification model training method of claim 7, wherein the preset value is a sample capacity of N % of the samples in the spy set, and wherein the N % is a noise value of the spy set.

9. The classification model training method of claim 6, wherein the termination condition comprises any one of:
  a sample capacity of an unlabeled sample comprised in the current negative training set is less than a preset value;
  a sample capacity of the current negative training set is less than the preset value; or
  a quantity of negative training set updates in a process of updating from an initial negative training set to the current negative training set exceeds the preset value.

10. The classification model training method of claim 1, further comprising:
  determining, using the target classification model, categories of all samples in the unlabeled sample set to obtain a determining result; and
  extending the dictionary based on the determining result.

11. A classification model training apparatus comprising:
  a memory configured to store instructions; and
  a processor coupled to the memory, wherein the instructions cause the processor to be configured to:
    obtain a positive training set and a first negative training set, wherein the positive training set comprises samples of a positive sample set in a corpus, wherein the first negative training set comprises samples of an unlabeled sample set in the corpus, wherein the positive sample set belongs to a dictionary, and wherein the unlabeled sample set does not belong to the dictionary;
    train, using the positive training set and the first negative training set, to obtain a first classification model;
    obtain, using the first classification model, a pseudo negative sample in the first negative training set, wherein the pseudo negative sample is a positive sample;
    remove the pseudo negative sample from the first negative training set to obtain a second negative training set; and
    train, using the positive training set and the second negative training set, to obtain a second classification model, wherein the second classification model is a target classification model.

12. The classification model training apparatus of claim 11, wherein the instructions further cause the processor to be configured to:
  score, using the first classification model, all samples in the first negative training set; and
  determine a sample with a score higher than a threshold in the first negative training set as the pseudo negative sample in the first negative training set.

13. The classification model training apparatus of claim 12, wherein the first negative training set further comprises at least one spy sample, wherein the at least one spy sample is in a spy set, wherein the spy set comprises a plurality of samples from the positive sample set, wherein the positive training set does not comprise the spy set, and wherein the threshold is either:
  based on a probability distribution fitting parameter for scores of spy samples comprised in the first negative training set; or
  based on a minimum score of samples ranking top k1% in terms of scores in a descending order in the spy samples, wherein k1 is a positive integer.

14. The classification model training apparatus of claim 12, wherein the threshold is either:
  a minimum score of samples ranking top k2% in terms of scores in a first descending order in unlabeled samples comprised in the first negative training set, wherein k2 is a first positive integer; or
  a minimum score of samples ranking top k3% in terms of scores in a second descending order in the first negative training set, wherein k3 is a second positive integer.

15. The classification model training apparatus of claim 11, wherein the instructions further cause the processor to be configured to:
  obtain the dictionary and the corpus;
  determine, based on the dictionary and the corpus, the positive sample set and the unlabeled sample set;
  set a plurality of first samples in the positive sample set as spy samples to constitute a spy set;
  populate the positive training set using a plurality of second samples in the positive sample set, wherein the first samples and the second samples are different;
  populate an initial negative training set using the unlabeled sample set and the spy set, wherein the initial negative training set is based on the corpus and not updated; and
  obtain the first negative training set based on the initial negative training set, wherein the first negative training set is either:
    the initial negative training set; or
    a negative training set obtained after the initial negative training set is updated.

16. The classification model training apparatus of claim 11, wherein after obtaining the first negative training set, the instructions further cause the processor to be configured to:
  determine that a termination condition is not met; and
  train, using the positive training set and the first negative training set, to obtain the first classification model,
wherein after obtaining the second negative training set, the instructions further cause the processor to be configured to:

determine that the termination condition is met; and train, using the positive training set and the second negative training set, to obtain the second classification model, wherein the termination condition indicates a condition for terminating update of a current negative training set, and wherein the current negative training set indicates a latest negative training set obtained when the termination condition is determined.

17. The classification model training apparatus of claim 16, wherein the termination condition comprises that a sample capacity of a spy sample comprised in the current negative training set is less than a preset value when the current negative training set comprises at least one spy sample, wherein the spy sample is in a spy set, wherein the spy set is constituted by a plurality of samples in the positive sample set, and wherein the positive training set does not comprise the spy set.

18. The classification model training apparatus of claim 17, wherein the preset value is a sample capacity of N % of the samples in the spy set, and wherein the N % is a noise value of the spy set.

19. The classification model training apparatus of claim 16, wherein the termination condition comprises any one of:

a sample capacity of an unlabeled sample comprised in the current negative training set is less than a preset value;

a sample capacity of the current negative training set is less than the preset value; or a quantity of negative training set updates in a process of updating from an initial negative training set to the current negative training set exceeds the preset value.

20. The classification model training apparatus of claim 11, wherein the instructions further cause the processor to be configured to:

determine, using the target classification model, categories of all samples in the unlabeled sample set to obtain a determining result; and extend the dictionary based on the determining result.

* * * * *